INVENTORS.
THOMAS G. BENGEL &
CALVIN E. KELLY
By Martin J. Carroll
Attorney

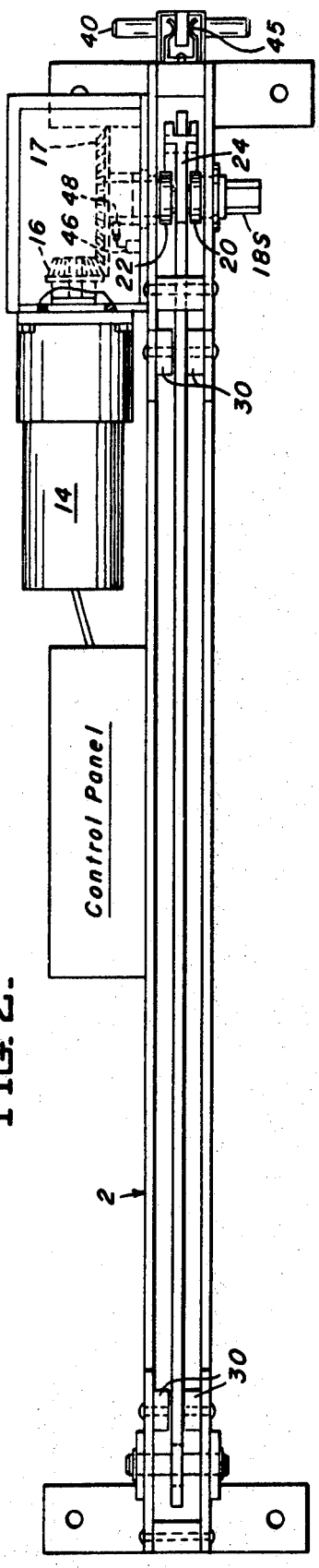
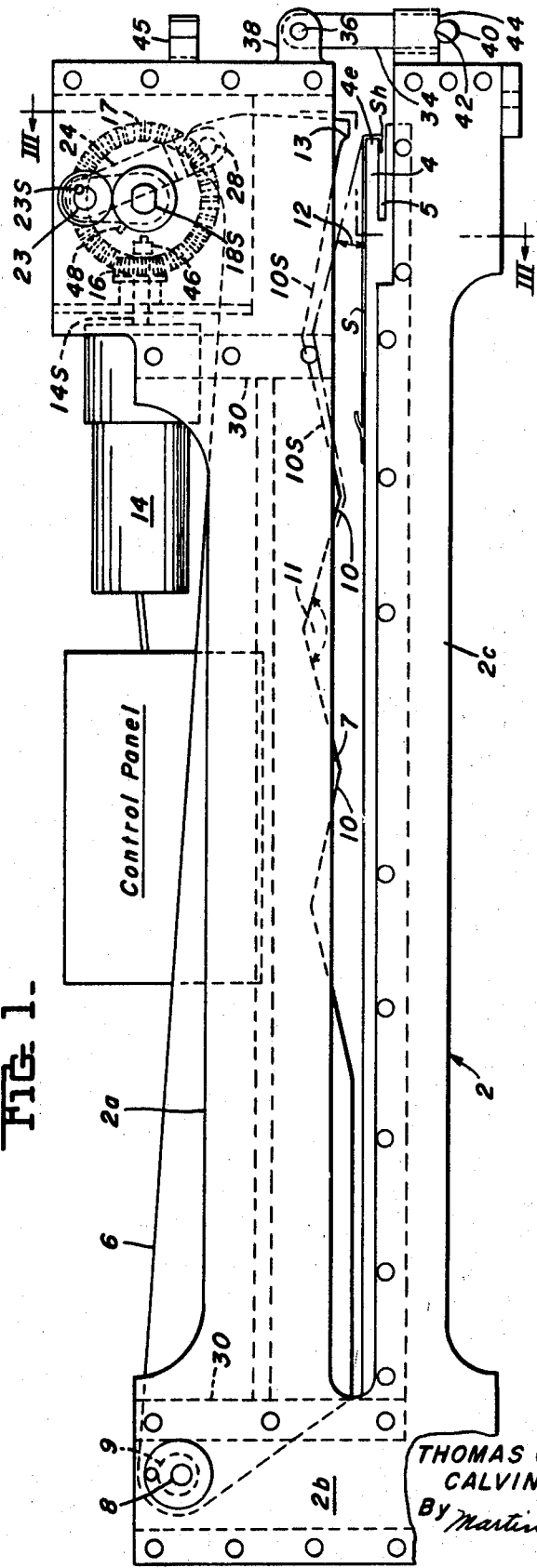

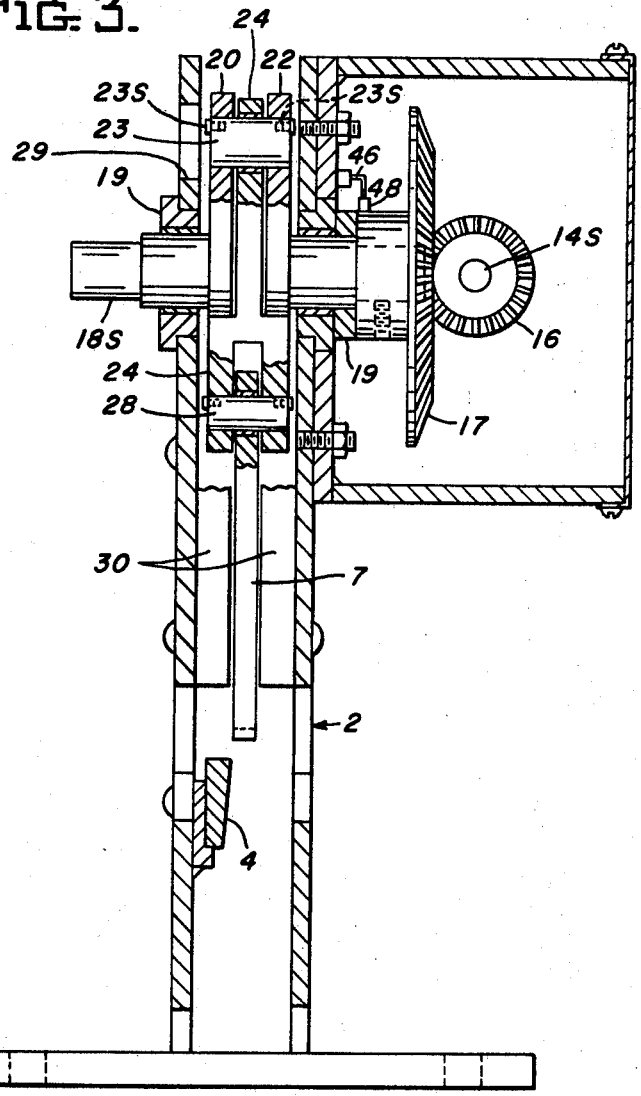
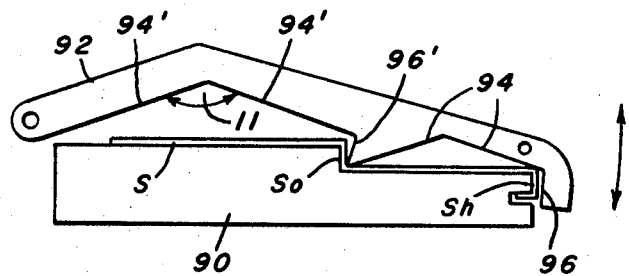

United States Patent Office 3,523,365
Patented Aug. 11, 1970

3,523,365
PORTABLE SHEAR
Thomas G. Bengel, Plum Borough, and Calvin E. Kelly, Franklin Township, Westmoreland County, Pa., assignors to United States Steel Corporation, a corporation of Delaware
Filed May 31, 1968, Ser. No. 733,654
Int. Cl. B26d 5/08
U.S. Cl. 30—229                                          9 Claims

ABSTRACT OF THE DISCLOSURE

A portable shear for cutting metal siding for residential construction having a C-frame supporting a shear blade and a pivotally serrated knife powered through an electric motor and crank system, the serrated knife and shear blade meeting at a cutting angle of between 5° and 10° to minimize required cutting force and stroke and to minimize the number of teeth and the number of penetrations of the siding, the crank system delivering the maximum force available from the motor at the knife's penetration of the siding.

---

This invention relates to a portable shear for cutting metal sheets and more particularly for cutting steel siding for residential buildings. Such siding is normally sheared in the field to the various required lengths. Existing shears perform satisfactorily for soft metals, such as aluminum, but no completely satisfactory shears are available for cutting steel sheets. Shuch shears for steel siding are expensive, unduly heavy, and/or require expensive power sources to provide sufficient cutting power for high quality cutting.

It is therefore an object of our invention to provide a portable, relatively light weight, inexpensive shear that provides straight and angular, burr-free, transverse cuts with minimum distortion of the siding.

Another object is to provide such a shear which transmits the maximum force available from the power source to the knife at the time of penetration of the metal.

A further object is to provide such a shear which minimizes the force required to accomplish a cut.

Still another object is to provide a shear which facilitates removal of scrap, further minimizing any tendency of buckling and binding during the cut.

Figure 4:
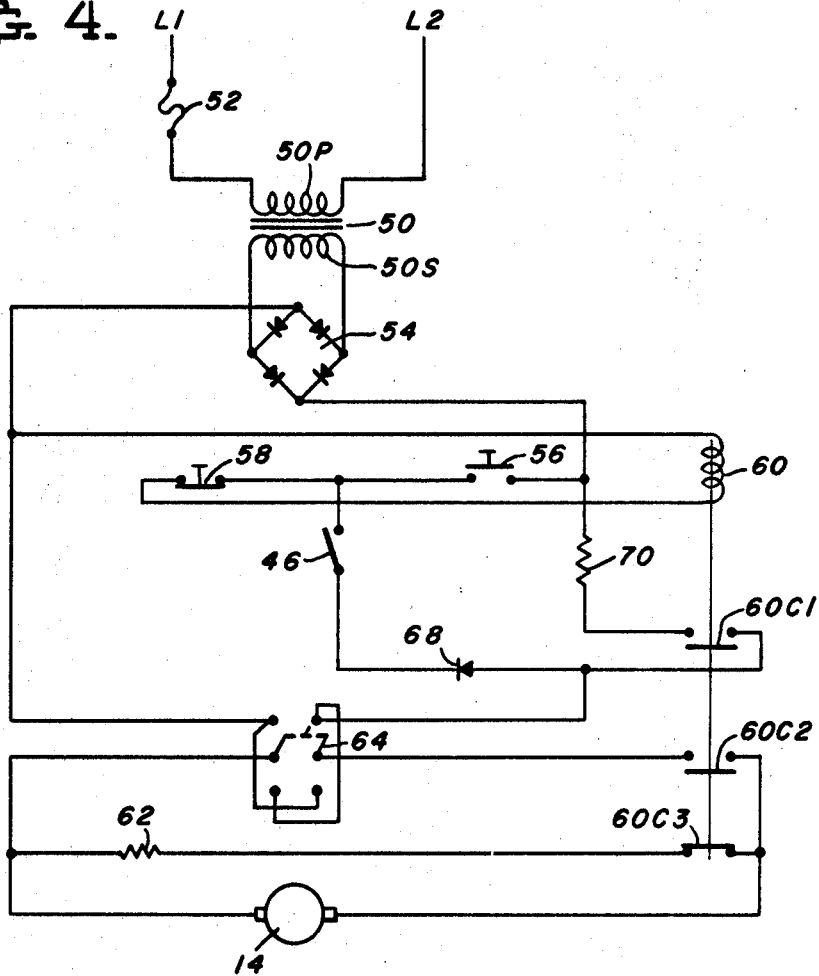
Figure 5:
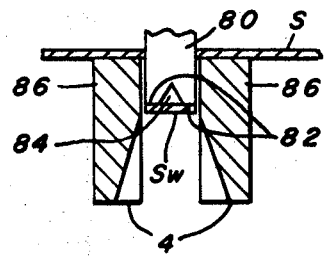

These and other objects will be more apparent after referring to the following specification and attached drawings, in which:

FIG. 1 is a side elevation of the shear of our invention;
FIG. 2 is a top plan view of the shear of FIG. 1;
FIG. 3 is a view taken on the line III—III of FIG. 1;
FIG. 4 is a schematic view of the motor control circuit of our invention;
FIG. 5 is a fragmentary vertical section showing a modified shear knife and shear blades; and
FIG. 6 is a fragmentary elevation showing another modified shear knife and shear blade.

Referring more particularly to FIGS. 1 to 4 of the drawings, reference numeral 2 indicates a C-shaped frame having an upper section 2a connected at one end by a vertical web 2b to a base 2c. An elongated shear blade 4 is fixed to base 2c and extends from a point adjacent vertical web 2b nearly to the outer or open end of the frame 2. A horizontal slot 5 adapted to receive the end of hook Sh of building siding sheet S is provided in the outer end of blade 4. A knife carrier 6, which supports a serrated knife 7, has one end attached to the vertical web 2b by a pivot pin 8 and eccentric 9. Knife 7 includes a plurality of triangular or V-shaped teeth 10 having cutting surfaces 10S. Angle 11, which is formed by the cutting surfaces where they meet at apexes, approaches but does not exceed 170°. Angle 12 formed by the interacting cutting surface 10S of the serrations and the blade 4 during the cutting action is between 5 and 10°. The knife 7 has an additional cutting surface 13 at the open or loading end of the shear end which maintains an angle of between 5° and 10° with the blade end 4e to accommodate the cut of the hook Sh of siding S. An electric motor 14 mounted on the free end of upper section 2a has a drive shaft 14s which supports a bevel gear 16. The gear 16 is in mesh with a bevel gear 17 mounted on a crank shaft 18s which is journaled in bearings 19 in upper section 2a. The crank shaft 18s includes two stub shafts, each journaled in one of the bearings 19 with crank arms 20 and 22 secured thereto in spaced apart relationship, with a pin 23 connecting the arms at their outer ends. The upper end of a link 24 is pivotally supported on pin 23 between crank arms 20 and 22, and its lower end is pivotally attached to knife 7 by a pin 28. In the preferred embodiment pin 23 connecting crank arms 20 and 22 is rigidly held in place by set screws 23S. An opening 29 is provided in the frame 2a opposite the link 20 and set screw 23S. Spaced apart brass guides 30 are preferably provided on the frame 2 for maintaining the knife 7 in alignment with blade 4.

The entry end of the frame is kept open to permit ready insertion of a sheet S to be sheared. To provide additional strength to the shear during operation and to maintain alignment of the knife 7 and shear blade 4 the following structure is provided. One end of an alignment bar 34 is pivotally mounted by means of a pin 36 in a bifurcated bracket 38 attached to the free end of upper section 2a adjacent the opening in the frame 2. The other end of the bar 34 has a pin 40 welded transversely thereto which is received in a notch 42 provided in a bracket 44 mounted on base section 2c. A bracket 45 mounted above bracket 38 secures the bar when not in use.

A limit switch 46 mounted on upper section 2a is operated by a trip 48 mounted on shaft 18s.

Referring now to FIG. 4, the motor control circuit includes a step down transformer 50 connected in series with an overload protector 52 to power source L1, L2. The transformer secondary 50s is connected in series with a full wave rectifier 54. Connected in series across the rectifier 54 are a start button 56, a stop button 58 and relay coil 60 having normally open contacts 60C1 and 60C2 and normally closed contacts 60C3. In parallel with the above described circuit and across the rectifier 54 is the motor 14, and also a by-pass circuit consisting of a resistor 62 and relay contacts 60C3, both across the reversing contacts of a double pole double throw switch 64. The limit switch 46 and a diode 68 are connected across the start switch 56, relay contacts 60C1, and a current limiting resistor 70 which close the circuit from the motor 14 to the rectifier 54.

In operation, a sheet of siding S is placed in the shear from the front with hook Sh fitting over blade end 4e into slot 5, with the sheet S extending over blade 4 into the shear. Alignment bar 34 is then rotated downwardly from its rest position in bracket 45 and its pin 44 inserted into notch 42 to lock the bar in place.

Start button 56 is momentarily closed to energize relay coil 60 causing contacts 60C1 and 60C2 to close and contacts 60C3 to open so as to energize high torque motor 14. Limit switch 46 is closed during this portion of the operation so that relay coil 60 is locked in through contact 60C1. Energization of motor 14 rotates gears 16 and 18 and shaft 18s. Rotation of shaft 18s rotates crank arms 20 and 22 to force link 24 and knife 7 downward. Crank arms 20 and 22 rotate through angle B in lowering knife 7 into contact with siding S, at which point the crank-linkage arrangement is in position to deliver to the knife 7 the maximum amount of force available for its cutting action. This maximum force is delivered at the time the knife teeth 10 and knife surface 13 pierce the siding S and hook Sh which is the part of the cutting operation that requires the most force. At this time the crank arms 20 and 22 and knife 7 are parallel to one another and perpendicular to the connecting linkage. The cut continues toward the apex 11 of the cutting surfaces 10S. In this embodiment only two cutting surfaces 10S plus surface 13 for the hook Sh are required, resulting in only one apex 11 per cut. This minimizes the number of apexes which can trap material and disturb the line of the cut. The utilization of the bow tie type shear permits opposite cutting actions minimizing resultant cutting forces on the siding, plus reducing the vertical stroke of the blade thereby minimizing bulk and cost of the shear. We have found that the best cutting angles for steel siding are 5° to 10° for initial contact of the knife with the siding. The minimum of 5° is desirable to minimize the force required for the cut, and the maximum of 10° is desirable to minimize the stroke of the knife. Variation within this range is available to produce a knife to accommodate a particular width of siding to be cut.

When the cut is completed, trip 48 opens the limit switch 46 to deenergize coil 60 and causing contacts 60C1 and 60C2 to open and contacts 60C3 to close, thus stopping motor operation and returning the circuit to its ready status.

Switch 64 provides a reversing function for motor 14 operation should it be necessary to back the knife 7 out of the cut.

The embodiment described in FIGS. 1, 2 and 3 shows a serrated knife 7 and a single shear blade 4. This construction provides a waste-free cut of siding, but imposes stringent requirements on knife 7 and blade 4 alignment and knife 7 tolerance. In this embodiment the separation between the knife and blade should be maintained between one and four percent of the siding thickness. This type of knife blade arrangement provides satisfactory service for thinner materials, but creep becomes a problem as thicknesses of material increase.

In the embodiment of FIG. 5 a single knife 80 having two lands or shearing edges 82 separated by a V-shaped groove 84 cooperates with a pair of spaced apart shear blades 86 so as to cut out a strip of metal (waste Sw) for each cut made. The elongated blades 86 are spaced apart a distance equal to the knife thickness plus up to ten percent of the thickness of the siding. Further, the blades 86 are relieved to facilitate removal of the waste. The minimum width of each land 82 is one fourth of knife thickness. The angle between the sides of groove 84 is preferably 100°. This design causes the applied shear force to be concentrated at the contact edges of the knife 80 and blades 86 and permits easy remachining of the shear blade 86. The operation is otherwise the same as for the first embodiment.

In the embodiment of FIG. 6, shear blade 90 has a stepped configuration substantially matching the contour of the siding. Knife 92 has two sets of cutting surfaces 94 and 94' in addition to surfaces 96 and 96' which accommodate the hook Sh and vertical offset So. It is to be noted that in this embodiment, the same criterion applies, i.e., contact angles between the knife and all surfaces are between 5° and 10°. Each surface level has a double action cut with only one trapping apex.

Thus, conditions are met to minimize the knife stroke, so as to provide the best combination of size and weight in the frame 2. Cutting forces are minimized and utilized most advantageously allowing for use of a smaller motor 14, and a conventional power system is utilized, 115 v., A.C. converted internally to D.C. All the above culminate in a shear of minimum weight, size and cost.

While several embodiments of our invention have been shown and described, it will be apparent that other adaptations and modifications may be made without departing from the scope of the following claims.

We claim:

1. A shear for cutting sheets comprising a frame, at least one elongated shear blade supported generally horizontally on said frame, a knife carrier, pivot means supporting one end of said knife carrier on said frame, said pivot means being located at a point spaced from one end of the shear blade a substantial distance above the top thereof, means for rotating said knife carrier about its pivot means, and an elongated knife supported on said knife carrier and cooperating with said shear blade in a cutting action, said knife having a plurality of V-shaped serrations along the length thereof forming cutting edges and being of such structure that the angular relation of the interacting serrations and the shear blade during the cutting action is between 5 and 10 degrees, said serrated knife being positioned so that the V-shaped serration at the end remote from said pivot means extends a substantial distance toward the pivot means from a point overreaching the shear blade.

2. Apparatus according to claim 1 in which the means for rotating the knife carrier about its pivot means includes a rotatable crank arm pivotally mounted on said frame; means for rotating the crank arm; and a linkage having one end pivotally attached to the crank arm and its other end pivotally attached to said knife carrier.

3. Apparatus according to claim 2 wherein at the instant of penetration of the sheet by the serrated knife, the crank arm and knife are substantially parallel to one another and perpendicular to said linkage, and the pivot means for attaching the linkage to the crank arm is substantially above the pivot means for attaching the linkage to the knife.

4. Apparatus according to claim 3 in which the means for rotating the crank arm includes a high torque electric motor mounted on the frame, a gear drive interconnecting the motor and the crank arm, and means for controlling the operation of said motor.

5. Apparatus according to claim 4 in which the means for controlling the operation of said motor includes a power supply, a motor control circuit connected to said power supply, means in said control circuit in series with the motor for stopping the motor at a predetermined load, a switch in said control circuit for starting said motor, a switch in said control circuit for stopping said motor, and a limit switch in said control circuit and operable by said crank arm for stopping said motor when the knife is in raised position.

6. Apparatus according to claim 5 in which said frame is C-shaped with an opening at one end; and said apparatus includes means for closing said opening, said closing means comprising mounts supported on said C-shaped frame above and below said opening, and an alignment bar adapted to be rigidly attached to the mounts during the cutting operation and movable from said opening during insertion of the sheet.

7. Apparatus according to claim 6 wherein the shear blade has a cutting contour substantially identical to the contour of the sheet to be cut.

8. Apparatus according to claim 7 wherein the shear includes a single shear blade and the lateral clearance between the blade and knife during shearing is between one and four percent of the thickness of the sheet being cut.

9. Apparatus according to claim 7 wherein the shear includes a pair of elongated shear blades in parallel and spaced apart relationship with an opening between the blades which diverges downwardly, and the serrated knife is adapted to be received in the opening between the blades, said knife having longitudinal spaced apart shearing edges with a groove therebetween.

References Cited

UNITED STATES PATENTS

| | | | |
|---|---|---|---|
| 2,219,602 | 10/1940 | Rayner | 83—607 |
| 2,496,018 | 1/1950 | Pearson | 83—607 |
| 2,660,241 | 11/1953 | Junkunc | 83—601 |
| 2,703,613 | 3/1955 | Gundlach | 83—601 |
| 3,279,295 | 10/1966 | Teplitz | 83—607 X |
| 3,393,595 | 7/1968 | Halverson | 83—609 X |

LESTER M. SWINGLE, Primary Examiner

J. C. PETERS, Assistant Examiner

U.S. Cl. X.R.

83—601